United States Patent

[11] 3,594,735

[72] Inventors James H. Furlong;
Carl V. Phillips, both of Columbus, Ohio

[21] Appl. No. 755,352
[22] Filed Aug. 26, 1968
[45] Patented July 20, 1971
[73] Assignee The Exact Weight Scale Company
Columbus, Ohio

[54] DATA RETRIEVAL APPARATUS
5 Claims, 3 Drawing Figs.

[52] U.S. Cl. .......... 340/173 LM, 340/172.5, 340/347 AD
[51] Int. Cl. .......... G11c 13/04
[50] Field of Search .......... 340/173, 347 AD, 172.5

[56] References Cited
UNITED STATES PATENTS
3,020,534 2/1962 Jones .......... 340/347

*Primary Examiner*—Terrell W. Fears
*Attorney*—Francis T. Kremblas, Jr.

ABSTRACT: An apparatus for the retrieval of prestored information which incorporates a novel data storing means in the form of a rotatable disc provided with an optically sensed code wherein the code is nonanalogous to shaft position. The apparatus also includes means for creating optical signals responsive to the code on the disc and means for sensing and converting the optical signals into electrical signals. Certain of these electrical signals are compared with predetermined reference signals for locating the desired data on the disc for retrieval upon appropriate command.

INVENTOR.
JAMES H. FURLONG
CARL V. PHILLIPS
BY Francis J. Kremblas Jr.
ATTORNEYS INVENTOR.
JAMES H. FURLONG
CARL V. PHILLIPS
BY
Francis T. Kremblas Jr.
ATTORNEYS

DATA RETRIEVAL APPARATUS

The present invention relates generally to apparatus for information retrieval and particularly to a novel data storing means and associated apparatus for retrieving the data stored.

Prior to the present invention, data storing or memory apparatus for information retrieval were of the magnetic core or magnetic drum type. These devices, however, are very expensive and economics limits the possible applications in which automatic data retrieval apparatus might be used to increase efficiency and reduce labor costs.

In general the apparatus of the present invention incorporates a novel data storage device in the form of a rotating disc provided with an optically sensed code. However, the code is nonanalogous to shaft position in contrast to the widely known, conventional shaft encoders wherein the code is directly related to the shaft position.

The code is formed on the disc by a plurality of selectively placed opaque and at least translucent areas. A source of light is directed on the disc and optical sensing means are aligned on the opposite side of the disc to receive the optical signals and to convert them to electrical signals. These electrical signals may be compared with predetermined electrical signals to locate the desired data on the disc. Upon coincidence of certain compared signals, the signal from the optical sensing means which represents the desired data is used to actuate automatic printing apparatus which reduces the data into a legible form.

It is therefore an object of the present invention to provide an apparatus of the type described which rapidly retrieves and records prestored information in a reliable manner.

It is another object of the present invention to provide an apparatus of the type described which permits the retrieval of stored information and yet which is many times less expensive than prior art methods and means.

It is still another object of the present invention to provide a low cost data storing means which is much less susceptible to accidental destruction of the stored data as compared to prior methods and means.

Further objects and advantages of the present invention will be apparent from the following description, reference being had to the accompanying drawings wherein a preferred form of embodiment of the invention is clearly shown.

IN THE DRAWINGS

Figures 2, 3:
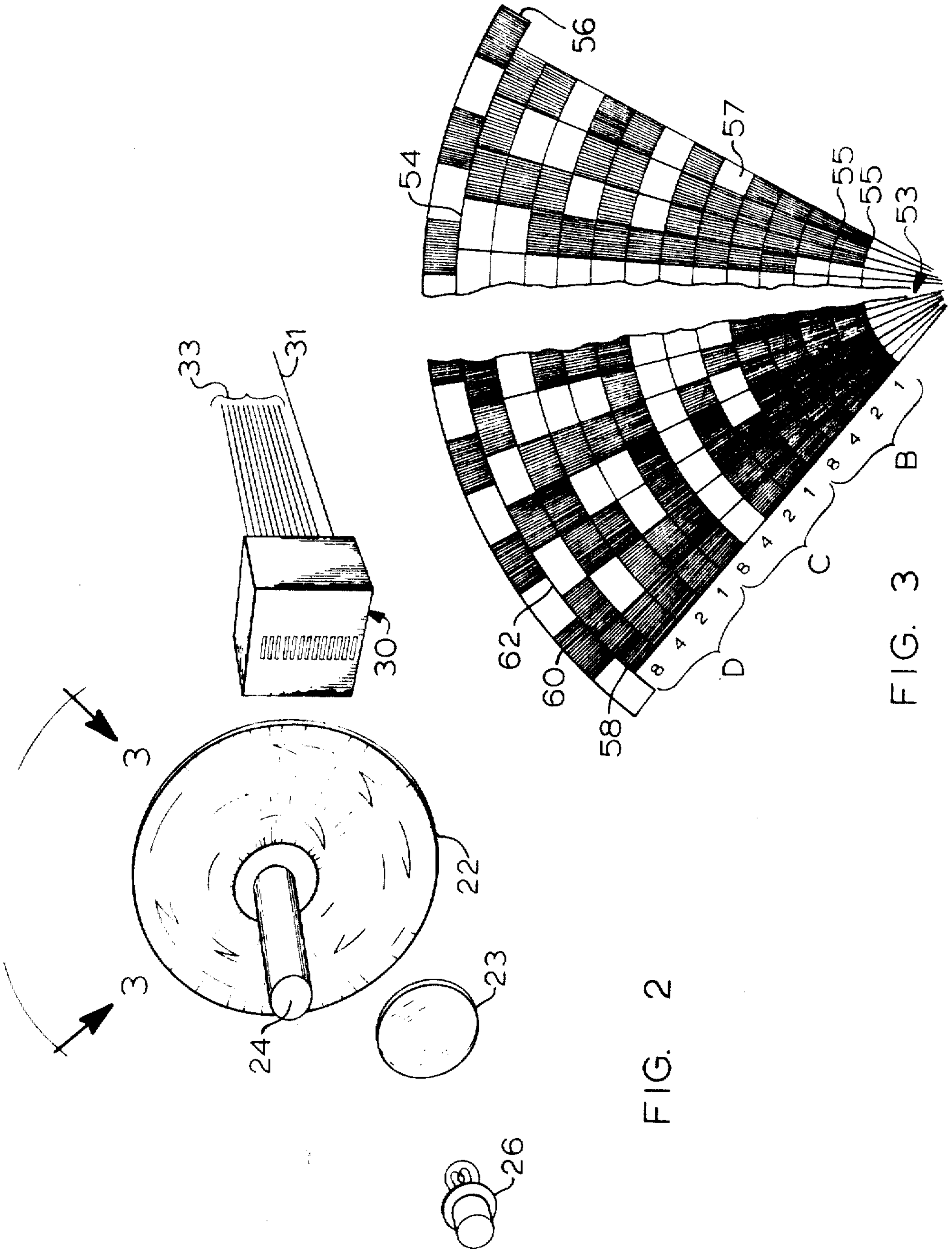
FIG. 2 is an illustrative perspective view of a portion of the apparatus shown in FIG. 1 illustrating the novel data storing means and associated optical sensing means.
FIG. 3 is a partial front elevational view of a disc forming a portion of the apparatus of the present invention.

A data storing or memory means, indicated generally at 20, and illustrated in detail in FIG. 2, includes a disc 22 mounted on a rotatable shaft 24 which is driven by a conventional motor, not shown. Disc 22 is constructed similarly to a conventional shaft encoder disc, however, it is important to point out that the code on disc 22 is nonanalogous to shaft position and therefore fulfills a completely different purpose than the conventional shaft encoder.

The code is formed by a plurality of opaque and at least translucent, but preferably transparent, areas arranged in a predetermined pattern as described in detail later herein.

A light source 26 may be focused through lens 23 on disc 22 as it is rotating to create optical signals on the opposite side of the disc responsive to the opaque and transparent areas.

A plurality of photoelectrical cells 30 function as optical sensing means and convert the optical signals to electrical signals responsive to the beam of light passing through a transparent area on the disc in alignment with a respective cell.

It should be readily understood that various types of information may be placed on the disc, such as for example, numerical charge schedules or the like for use in a parcel post delivery service.

For example, a typical code is illustrated in FIG. 3 which shows a portion of disc 22 wherein the code is for a rate schedule used in a parcel post delivery service. The rates vary according to the weight of the parcel and the particular arbitrary geographical area or "zone" to which the parcel will be delivered.

In the example shown, a plurality of arcuate segments, indicated generally at 53, are divided by twelve tracks formed by a plurality of concentric circles such as 55. The intersection between the tracks and segments 53 define a plurality of areas such as 57.

For purpose of illustration only, the segments and concentric circles are actually shown in FIG. 3 however, on an actual disc manufactured by a photographic process, the individual circles and segments do not appear as such. Also the opaque areas on the disc are merely indicated by being shaded.

In the code illustrated, twelve tracks intersect the segments 53 to form a plurality of areas 57 representing three groups B, C, and D. The areas 57 in each group represent the numerical quantities 1, 2, 4 and 8. Therefore it should be readily understood that any digit from 0 to 9 may be represented in any single group and the three groups permit a representation of any number between 0 and 999 in a single segment.

In a typical parcel post delivery service, the rates vary for parcels between 0 and 50 lbs., at 1 pound graduations and according to the arbitrary zone to which the parcel is to be delivered.

Therefore, disc 22 may be divided into a plurality of equal major segments, not shown, each representing a given "zone". then each major segment would be divided into 51 equal minor segments such as 53.

The first minor segment in each major segment is coded to denote the "zone" and each of the remaining minor segments represent a rate for parcel weights between 0 and 50 lbs. at one pound graduations.

In the particular example shown, a "zone" segment is differentiated from the adjacent "rate segments" by always leaving the outer two areas in group D transparent and then coding the zone number with the remaining groups B and C. As seen at 54, the code "reads" Zone 3.

Still referring to FIG. 3, and in further describing the code illustrated, segment 58 "reads" 40 cents, segment 60 "reads" 44 cents, segment 62 "reads" 49 cents, and so forth.

A 13th track 56 comprises areas which are offset one-half a segment relative to the other segments and functions as a timing track. Each area in track 56 is alternately opaque and transparent to transmit a series of "timing" signals or impulses. This function will be described in detail later herein.

Figure 1:
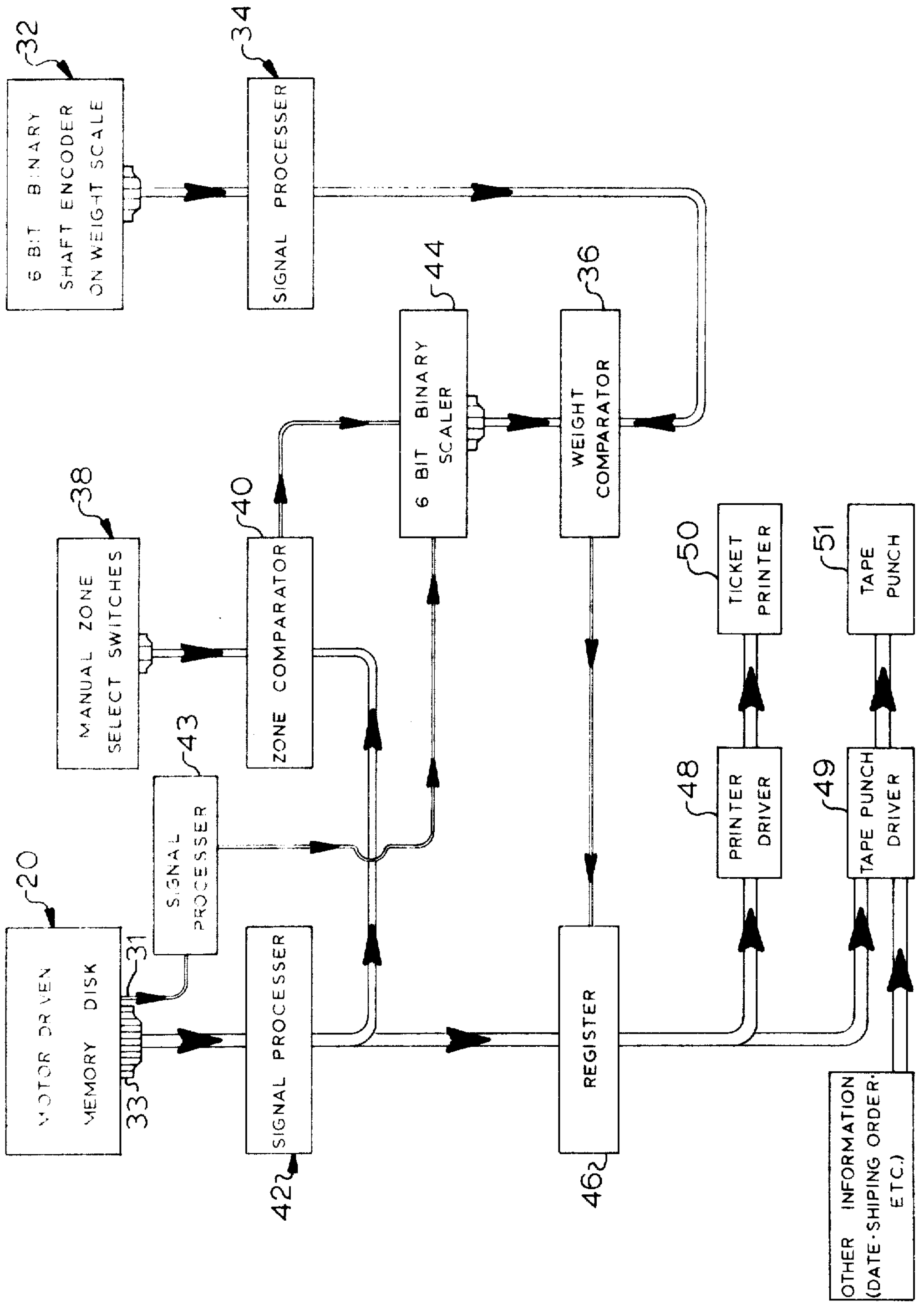
FIG. 1 is a diagrammatic view of a typical apparatus for information retrieval constructed in accordance with the present invention.

Referring now to FIG. 1, a typical embodiment of the present invention is shown and includes a weighing scale provided with transducing means in the form of a six-bit binary shaft encoder, indicated generally at 32.

The reference electrical signal provided by the scale encoder is proportional to the weight indicated by the scale and is received by a signal processor 34, preferably in the form of a conventional buffer amplifier, which in turn is operatively connected to the input of conventional comparator 36.

Means for producing a second reference or indexing signal is indicated generally at 38, and preferably is in the form of a manually actuated conventional diode encoder which is operatively connected to an input of another convention comparator 40.

The other input of comparator 40 is operatively connected to a signal processor 42, preferably in the form of a buffer amplifier.

Signal processor 42 is operatively connected to 12 of the photocells 30 by leads 33. These 12 photocells are aligned with the 12 innermost tracks of coded disc 22.

The remaining photocell of photocells 30 is aligned with the outermost track 56 on disc 22 and is operatively connected to a signal processor 43 via lead 31. Signal processor 43 is connected to a counter 44, preferably in the form of a six-bit binary scaler.

The output signal from comparator 40 is also connected to scaler 44 and functions to actuate the scaler to "count" the signals developed from outermost track 56.

The output signal from scaler 44 is in turn operatively connected to the other input comparator 36.

A temporary storage means in the form of a conventional storage register 46 is operatively connected to the cells 30 via processor 42. Upon coincidence between the input signals to comparator 36, an output signal is developed which actuates register 46 to store the instant signal being received from the 12 photoelectric cells 30 connected to processor 42 via leads 33.

Register 46 is in turn operatively connected to a printer driver 48 and a conventional automatic ticket printer 50.

If desired, a driver 49 and a tape punch 51 may also be connected to the output of register 46 as may other conventional apparatus to provide other data such as the date or shipping order number, for example, to make a permanent record to be kept by the user.

The operation of the present invention will be described with reference to a typical parcel post-type delivery service.

An operator would first place the package to be delivered on weighing scale 32. The shaft encoder produces a "weight signal" sensed at one of the inputs of weight comparator 36.

Then the operator would manually actuate the proper switch of diode encoder 38 to produce a predetermined indexing signal seen at one input of "zone" comparator 40.

The other input of "zone" comparator 40 sees the signals from the 12 photocells 30 connected to signal processor 42. When the appropriate segment carrying the proper zone code is aligned with the photocells, the input signals to comparator 40 coincide and a control signal is developed which actuates scaler 44 to begin to "count" the timing signals received from the "timing" photocell 30 connected to signal processor 43 via lead 31.

Scaler 44 in turn sends an increasing signal to the input of weight comparator 36 proportional to the number of signals delivered by the "timing" photocell which represents the number of segments 53 passing the other photocells immediately following the proper zone segment.

It should be pointed out that the areas comprising track 56 are offset relative to the other segments so that each timing signal occurs substantially as each segment 53 is centered in alignment with the respective photocells 30.

When the correct number of timing signals have been "-counted" by scaler 44, a coincidence occurs between the input signals from scaler 44 and weighing scale 32 to weight comparator 36. A control signal is then developed which commands storage register 46 to trap the instant signal delivered by the 12 photocells 30 aligned with the 12 innermost tracks. This signal represents the proper rate information corresponding to the weight of the package on weighing scale 32 and the zone to which it is being sent.

Now upon any appropriate actuation, the stored signal in register 46 may be used to actuate a conventional automatic ticket printer 48 to "readout" and print the proper charge information onto a ticket. The ticket is then simply affixed to the package which is ready for delivery.

It is, of course, important in this application and in other types of applications to also have a permanent record made for checking purposes or bookkeeping needs.

This is easily accomplished by operatively connecting an appropriate type punch to register 46 to make a tape which carrys a record of the transaction which may also include other information, such as the date and identifying shipping numbers.

Then the user has a permanent record of shipments made and of the cost of each shipment.

From the foregoing description, it should be readily apparent that other codes nonanalogous to shaft position may be used to represent other logic data for many various applications without departing from the spirit of the present invention.

It is important to point out that if the rates change, for example, in the application described herein, a new disc may be easily substituted carrying a code embodying the changes at a relatively small cost compared to making such changes in the prior art method and means.

Further, disc 22 is far more immune to accidental destruction as compared to magnetic types of memory devices as it is unaffected by magnetic disturbances.

While the form of embodiment of the present invention as herein disclosed constitutes a preferred form, it is to be understood that other forms might be adapted all coming within the scope of the claims which follows:

We claim:

1. Data retrieval apparatus comprising, in combination, a disc mounted on a rotatable shaft and including coded representations, said code being formed by a plurality of opaque and at least translucent areas arranged in a predetermined pattern on said disc; a source of light directed on at least a portion of said disc to produce optical signals responsive to said opaque and at least translucent areas on said disc; photosensing means disposed on the opposite side of said disc relative to said source of light and aligned therewith for sensing and converting said optical signals to electrical signals; means for producing address reference signals for comparison with address electrical signals from said photosensing means for signifying the location of said coded data on said disc; means for comparing said address reference signals to said address electrical signals and means for converting the data content of said electrical signals from said photosensing means to a legible record upon coincidence of the signals being compared.

2. A data retrieval apparatus comprising, in combination,

A. disc means mounted on a rotatable shaft and including a plurality of opaque and at least translucent areas arranged in a predetermined coded pattern;

B. a source of light directed on at least a portion of said disc to produce optical signals responsive to said coded pattern;

C. a plurality of photoelectric cells disposed on the opposite side of said disc relative to said source of light and aligned therewith for sensing and converting said optical signals to electrical signals;

D. means for producing a first indexing signal;

E. means for producing a second indexing signal;

F. first comparator means having one input operatively connected to said means (D) and a second input operatively connected to at least certain of said photoelectric cells for developing an output signal upon coincidence between said input signals;

G. counter means operatively connected to at least one of said photoelectric cells and actuated by said output signal from said first comparator means to produce an output signal responsive to the signals received from said photoelectric cell;

H. second comparator means having one input operatively connected to said means (E) and the other input operatively connected to said output signal from said counter means for developing an output signal upon coincidence between said input signal;

I. temporary storage means operatively connected to at least certain of said photoelectric cells and actuated by the output signal of said second comparator means for storing the instant signal being received from said photoelectric cells;

J. and means for actuating the release of said signal stored in said temporary storage means and for converting said signal into a legible form.

3. In a read only memory device, the combination of

A. a rotatable disc provided with coded information formed on said disc by a plurality of opaque and at least translucent areas arranged in a predetermined pattern representing stored information;

B. a source of light directed upon at least a portion of said disc to produce optical signals responsive to said coded information;

C. photosensing means disposed on the opposite side of said disc relative to said source of light and aligned therewith for sensing and converting said optical signals to electrical signals, said photosensing means including address reading means and stored information reading means;

D. address selection means for producing indexing signals comparable with signals derived from said address reading means;

E. comparator means having one input operatively connected to said photosensing means and a second input operatively connected to said address selection means (D) for developing an output signal upon coincidence between said input signals; and F. temporary storage means operatively connected to said photosensing means and actuated by the output signal of said comparator means for storing the instant signal being received from said stored information reading means during said coincidence.

4. A device according to claim 3, wherein means is provided for actuating the release of the signal stored in said temporary storage means and for converting said signal into a humanly readable form.

5. A device according to claim 3, wherein a counting means is operatively connected to receive the output from said address reading means for selecting the position of said stored information.